ELECTRICAL DIGITAL COMPUTERS

Filed Jan. 19, 1961 2 Sheets-Sheet 1

Inventor:
François H. Raymond
By
Kemon, Palmer, Stewart & Estabrook

Inventor:
François H. Raymond
By
Kemon, Palmer, Stewart & Estabrook

United States Patent Office 3,281,792
Patented Oct. 25, 1966

3,281,792

ELECTRICAL DIGITAL COMPUTERS

François Henri Raymond, Saint-Germain-en-Laye, Seine et Oise, France, assignor to Societe d'Electronique et d'Automatisme, Courbevoie, Seine, France Filed Jan. 19, 1961, Ser. No. 83,664
Claims priority, application France, Feb. 1, 1960, 817,390, Patent 1,256,040
8 Claims. (Cl. 340—172.5)

Figure 1:
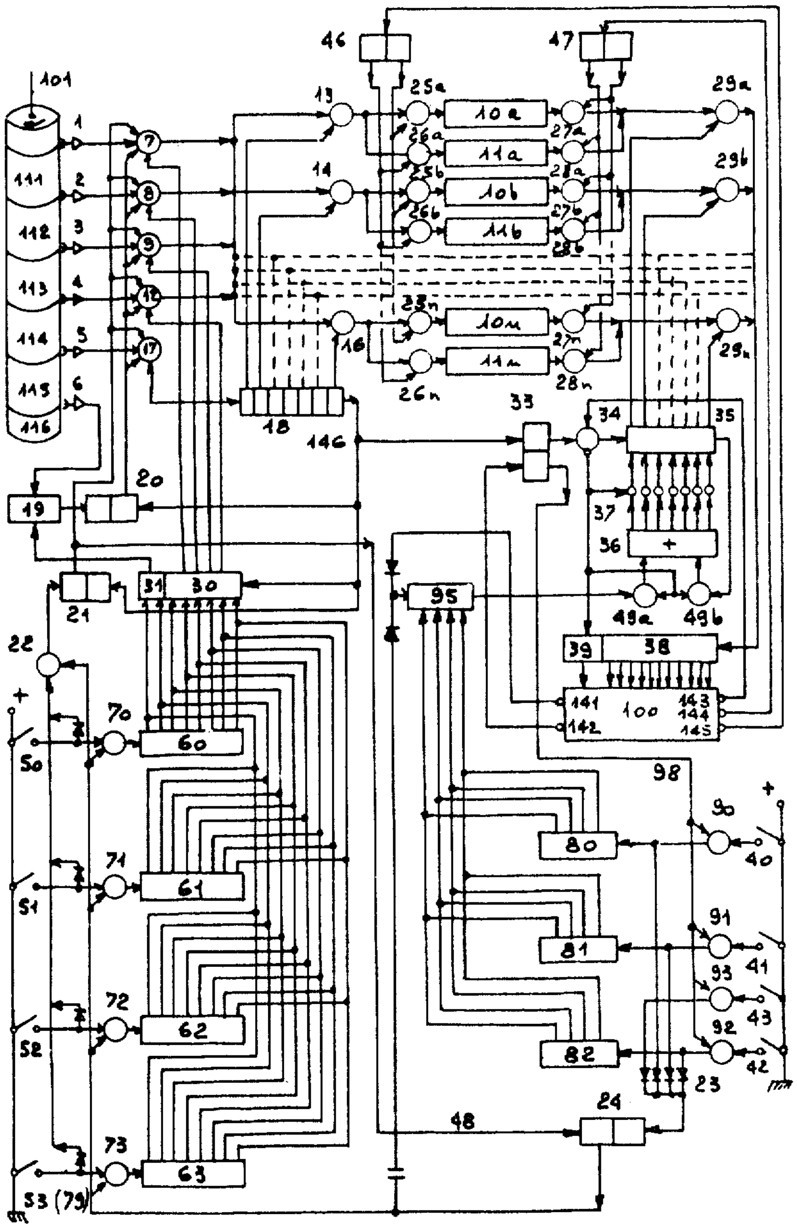

The present invention concerns improvements in or relating to electrical digital computers operating in accordance with programmes of instruction-words which are stored in a large capacity store externally of the computer and which are to be selectively introduced into smaller capacity internal stores of the computer for the conventional execution thereof, further data and mainly numerical data being also stored in internal stores of the said computer.

It is conventional to divide the external as well as the internal stores of a computer into a plurality of locations of "words," each word, instruction word or number word, having a predetermined number of digital places. Each location of word is defined by a numerical code termed an address and said numerical codes are given in natural sequence of numbers, each code being increased by one unit with respect to the next prior one. Each programme comprising a sequence of instruction words begins at a known and definite address in the external store, and when transferred into an internal store of the computer, will also begin at a known and definite address of said internal store.

For effecting transfers of programmes from the external store to an internal store, or vice-versa, is it now usual to operate by transfers of blocks of instruction words, each block comprising a predetermined number of words. For such transfers, the store addresses are divided in groups or slices and consequently, a single instruction of transfer of blocks of instruction words suffices for controlling such an operation. Such an instruction comprises a symbol code defining the operation proper plus at least one code of address, that defining the address of the first instruction word of the programme to be read-out from the store from which it is stored, and, when required, the code of address of the first location to which said first instruction word must be introduced into the receiving store. Said second address is not always useful as arrangements are known for automatically routing a transferred block of words to a suitable portion of the receiving store.

Of course, a complete programme may occupy more than one group of addresses but this is without importance as it suffices that the last instruction word of a programme includes an instruction to continue the transfer of the programme for a further block of words, so that, actually, a single transfer block instruction always suffices for transferring a complete programme from one store to another one, either for introducing a programme into an internal store of the computer or for re-transferring a programme into the extenal store of the said computer.

Several programmes are stored in the general large capacity external store and it is an object of the invention to provide simple and efficient means for enabling an operator to select one of said programmes and introduce it within an internal store of the computer.

A further object of the invention is to simultaneously provide simple and efficient means for enabling the operator when selecting a programme, to modify part of said programme according one of several possible modifications at his disposal for the computer.

Such a further possibility is based on the well known address modification process usual in computers of the concerned kind. Such process consists of the provision of a storing register wherein may be introduced a numerical code and, each time an instruction contains a special symbol, said numerical code is added to the numerical code of an address included in said instruction. But, for the transposition of such a process to the modification of a programme in accordance with the invention, the modification of an address will not be applied to an address code internal to an instruction word but to the very address of an instruction to be executed after an instruction containing a special symbol to such effect. It may be briefly stated that in the execution of a programme, the instruction words are sequentially called in an uninterrupted sequence of their addresses in the concerned store under the control of a member usually called a sequence control switch, i.e. a kind of counter having its content automatically increased by one unit at each execution of an instruction of a programme. Each time the content of said counter is abruptly modified from an external action, a break of sequence occurs in the execution of the normal sequence of instructions in a programme, since instead of the execution of the next following instruction it is the execution of another instruction of the programme which is made.

According to a feature of the invention, a plurality of one-word stores are provided, each being present to the code of an address of first instruction in a different programme, and manually controlled means are provided in connection with the plurality of one-word stores for selectively transferring, at the choice of an operator, a content of one of said one-word stores external to the computer, to an internal one-word store of the computer and to initiate from such a transfer of a single instruction the transfer of the complete programme from the external store into an internal store of the computer.

According to a further feature of the invention, a second plurality of one-word stores are provided for the presetting of as many numerical codes, and manually controlled means are provided in connection with said second plurality of one-word stores for selectively transferring the numerical content of one of said second one-word stores, external to the computer, into a one-word store internal to the computer and acting as a register of instruction-addresses modification for the instructions of the selectively introduced programme, one of said second one-word stores being blanked for a transfer without any modification of instruction addresses in a programme.

According to a further feature of the invention, said manually controlled means for the first and second plurality of external one-word stores are so combined that the actuation of one of the controls of transfer of an instruction word contained in a store of the first plurality only becomes effective if and only if a prior actuation of a control of transfer of a modification code (including zero) has occurred.

Figure 2:
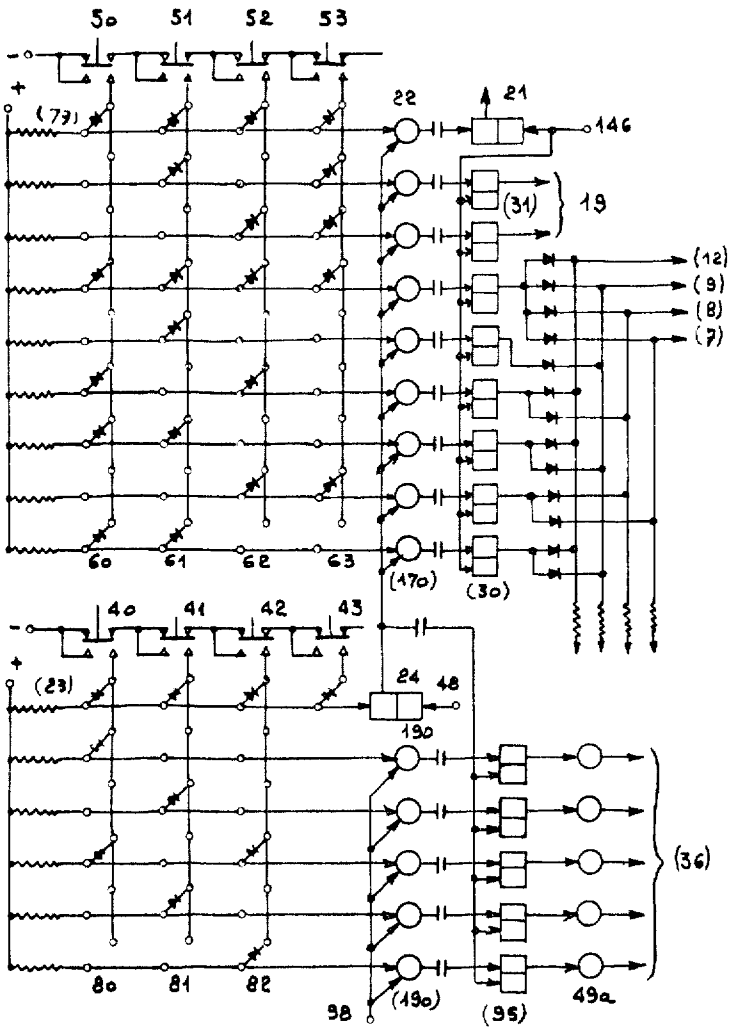

For a detailed description of these and further features of the invention, reference is made to the accompanying drawings, wherein:

FIG. 1 shows an illustrative general diagram of a system of computation according to the invention; and, FIG. 2 shows an illustrative example of embodiment of coding and selecting means for manual control in such a system as shown in FIG. 1.

The illustrative embodiment of the invention comprises a digital computing system wherein the external store is made of a magentic drum which is most often the case in actual practice. Said drum is shown as 101 and several recording tracks for the programmes, 111, 112, 113 and 114 are shown on the drum together with two other tracks, one of them 115 recording the tags or points of beginning of the words for any and all of the other tracks, and said track 115 thus marking the minor cycles of the drum operation, and the other of them 116 recording marks or tags for the beginnings of the portions of tracks where programmes may begin on the other tracks of the drum. Of course more than four programme tracks will exist on the drum in actual practice. It may be assumed, for the sake of clarity, that each track is divided in four parts, each quarter corresponding to a particular programme portion and further that, in the concerned example, the selection of an address of beginning of a programme may be possible in each one of the four programme tracks shown on the drawing. Each programme portion may, for instance, comprise thirty-two words. However for the sake of clarity of the drawing, neither the word counter 18 nor the internal stores such as 10*a*, 10*b*, . . . 10*n* and 11*a*, 11*b*, 11*n* are shown complete, and the gates associated with such members are only shown for the represented ones of said members.

For a selective read-out of a portion of programme from a track of the magnetic drum and a corresponding read-in of the instruction words of said portion of programme in an internal store of the computer, it is necessary to have recourse according to the invention to the following control equipment:

A code identifying a programme must be introduced in a register 30—31 wherein the part 31 receives the two binary digits defining which quarter of a track is concerned, and the part 30 receives the digital number defining the track proper of the drum;

A bistable circuit 21 must have been set to its activated or work condition for marking a transfer control;

A further bistable member 20 must have been set to its work condition from the output signal of a code comparator 19 which receives the code of the number of quarter of track at 31 and the codes of quarters of track read out of the track 116 by the reading head 6;

When the two bistable members 20 and 21 have been set to work condition, then the transfer stages 7, 8, 9 and 12 are ready for the unblocking of one of them by the activated output from the code registered at 31 so that the thus selected transfer stage lets pass the signal read out from the drum, reading head 1 to 4 respectively for the stages 7 to 9 and 12. Additionally the transfer stage or gate 17 is unblocked, said gate receiving the word tags signals from the drum and said signals are directed into a counter 18. After a count of thirty-two words an output signal issues from 18, resetting said counter and further resetting the gates 20 and 21 and erasing the content of register 30—31 which marks the end of the transfer operation of a portion of a programme.

The outputs of the gates 7, 8, 9 and 12 are united on the inputs of a plurality of thirty-two gates 13, 14, . . . 16 and said gates are sequentially made conductive by counter 18, one by one as counter 18 increases its count. Then, and according to the condition of a bistable member 46, the signals from the drum are routed on the one or the other of two groups of store registers 10*a*, . . . 10*n*, or 11*a*, . . . 11*n*, through the gates 25*a*, . . . 25*n* or 26*a*, . . . 25*n* as the case may be. The condition of the bistable member 46 may depend upon part of the code in 30 but, more often, it will depend upon the internal condition of the computer, output 145 of a block 100 not otherwise specified as outside the scope proper of the invention. Said block 100 is shown for indicating the general and conventional control and arithmetical units of the computer.

The extension of any number of groups of registers of internal stores is obvious: the outputs of gates 13, . . . 16 are multiplied on more than two transfer stages such as 25 and 26 and several members such as 46 (or a step-by-step counter instead of a set of bistable members) ensure the routing of the output signals from 13 to 15 through said plurality of gates including 25, 26 and the gates provided additionally to them.

For the manual control by an operator of the control arrangement provided in the invention for transferring selected programmes from the external drum store to the internal instruction store of the computer, a first group of keys and a second group of keys are provided. In the example, each group of keys includes four members. The keys of the first group are 50, 51, 52 and 53. Four registers 60, 61, 62 and 63 are controlled by said four keys through four gates 70, 71, 72 and 73. To the three keys 40, 41, 42 of the second group of manual keys are connected three registers 80, 81 and 82 through three gates 90, 91 and 92. The fourth key 43 of said second group is connected to a gate 93 not followed by a register. The four gates 90 to 93 are simultaneously unblocked when a bistable member 33 is at rest condition. Their outputs are united at 23 and consequently, when one of said keys 90 to 93 is depressed by the operator, during a period of time during which the gates 90 to 93 are unblocked, a bistable member 24 is set o work condition. When said member 24 is set to work condition, it unblocks the gates 70 to 73 connecting the keys 50 to 53 to the registers 60 to 63. When the bistable member 24 is at work condition, it further unblocks a gate 22 which receives the union or resultant of any voltages from the keys 50 to 53. When one of said keys 50–53 is depressed, with 24 at work condition, a signal will pass through 22 for setting the bistable member 21 to work condition. Consequently, the closure of one of the keys 50 to 53 after one of the keys 40 to 43 has been closed, by the operator, will introduce into the store 30–31 a code of address of the drum. Said code will be the one set into the one of the stores 60 to 63 corresponding to the key closed in the first group 50 to 53. Previously, the closure of one of the keys in the second group 40 to 43 will have introduced into a register 95 a numerical code, the one set in the register 80 to 82 corresponding to the closed key if said key is one of the keys 40 to 42, or zero if it is the key 43 which has been depressed. Note that register 95 is automatically reset to zero content when the bistable member 24 is set to work condition when it has not been previously reset by a signal of end of execution of a programme issuing at the terminal 141 of the block 100. Such a control from 141 will be disabled when the computer is intended to repetitively work on a programme introduced within its internal store.

Summarizing the function of the above described parts of a system according to the invention, it may be stated that the operator first selects an instruction address modification code by actuating one of the keys 40 to 43 and thereafter selects a portion of programme by actuating one of the keys 50 to 53, whereupon occurs an automatic transfer from the external drum 101 to one group of the registers in the internal store of a group of thirty-two instructions, the address of the first having been defined by the selection of the key in the group of keys 50 to 53. Thereafter, counter 18 resets to zero, as said, the store 30–31 and the bistable members 20 and 21 from its output 146 which is activated after a thirty-two count.

The counter 18 by the same output 146 also sets to work condition a bistable member 33 which will then enable the computer to execute a portion of programme, either the freshly introduced one or a previously introduced one. For this purpose, the outputs of the one-word stores 10*a*, . . . , 10*n* and 11*a*, . . . 11*n* (considering the case where only two groups of such stores constitute the internal store) are connected to as many gates 27*a*, . . . , 27*n* and 28*a*, . . . 28*n*, and the condition of a bistable member 47 controls one of the gate groups to be unblocked and the other group to be blocked, responsive to the condition of an output 144 of the computer block 100. When more than two groups of one-word stores are provided in the internal instruction store of the computer, then the member 47 is replaced by a multistable member such as a step-by-step counter, in a similar arrangement to that which has been proviously described for the input gates of such internal store.

All outputs of the gates 27, 28, . . . of identical subscripts, *a* to *n*, are united on the inputs of a single gate, from 29*a* to 29*n*. The outputs of such gates 29 are further connected to the input of a one instruction-word store 38–39. A step-by-step counter 35, of thirty-two positions, then controls the sequential read-out of the instruction words in the group of one-word stores selected by 47 and the sequential introduction of said instructions into the one instruction word store 38–39 for their progressive execution into the computer. Said step-by-step counter 35 advances by one step each time a signal marking the end of execution of an instruction is delivered from an output 143 of the block 100. However this signal will only be active when a gate 34 is unblocked and said gate is only unblocked when the bistable member 33 is set at work condition, viz when no operation of transfer of a portion of a programme of instructions is being effected, and when concomitantly, there is no inhibition from the output of part 39 in the one instruction word store 38–39. The purpose of said inhibition will be later described.

It is to be noted that it would not be imperative to ensure an interdiction of execution of a programme within the computer whilst a portion of a new programme is introduced in the internal store of the computer. However, for such a simultaneous condition of operation, a relative condition of members 46 and 47 must be so ensured that the group of one-word stores in the internal store which is defined by 46 be different to the group defined by the condition of 47. If actually the members 46 and 47 are bistable members, this would mean that when one of said members is at work condition, it will impose resetting of the other member to rest condition. When such members are multi-stable members, a coincidence circuit would be provided for checking that they are in different conditions and, when in the same condition, to inhibit one of the two operations: computation or introduction of a fresh portion of a programme, as required.

Whatever the case may be, the execution of a portion of the programme in the computer is as follows: the step-by-step counter 35 is brought to its first condition and consequently the first instruction word of a portion of programme of thirty-two words is introduced into the one instruction word store 38–39. From the content of this store, the block 100 will produce the execution of said first instruction, in a conventional fashion not to be described as being outside the scope of the invention, whereafter a signal marking the end of execution of the instruction will be issued at 143, the counter 35 advances by one step and produces the introduction of the second instruction of the group into 38–39; and so forth.

When in an instruction of such a portion of programme appears a mark controlling an address modification thereof, in the part 39 of the register 38–39, then from 39 the gate 34 is blocked and two transfer stages are on the other hand unblocked, **49*a* and 49*b*, as well as a plurality of gates 37 between the outputs of a parallel adder 36 and the counter 35. The codes contained in 35 and 95 are brought to the adder 36 through the gates 49*a* and 49*b* and, through the gates 37, the result of the addition is introduced in the counter 35 wherein it is substituted for the previous content. The store instruction address in 35 is then modified in accordance to the numerical code in 95, which has been preselected by the operator as hereinabove described. This results in an interruption of the normal sequence in the portion of programme. Such a break of sequence may be either forwards or backwards when the code at 95 is an algebraical one and the operation in the adder 36 actually results in an addition or a subtraction of said code to or from the numerical code or count previously existing in 35**.

When an instruction within 38–39 includes the symbol controlling a further transfer of a portion of a programme from the drum to the internal instruction store of the computer, which is useful for automatically calling a complete programme from the drum by a single initiating operation from the operator of the machine, each such instruction defining the next portion of programme to be introduced from the drum, the transfer of such a portion of programme will be initiated by the usual and conventional operation of the block 100 as it will be a conventional block-transfer instruction. Of course, the members 30–31, 21, 20 and 18 may be adapted to be used by a special control from the block 100 for such an automatic block-transfer operation since it will suffice in this respect that means exist for transferring into 30–31 the content of 38–39 in such an occurrence as the block-transfer instruction includes the code of the first instruction of the fresh portion of the programme to be introduced in the internal computer store. As however, such a use of special members is not imperative for a conventional block-transfer operation, the said means have not been shown in the drawing and will not be detailed.

Normally, the code of instruction address modification set into 95 from the manual action of the operator will remain valid for a complete programme. But here also, it may easily be conceivable that an instruction of a programme controls either an erasement of the content of 95 when executed by the computer, or a change of content of 95. The erasement may occur from such a connection as 141 activated from the computer block 100 either after the execution of a programme or after a predetermined number of executions of such a programme.

The bistable member 33 may be, when required, reset through a connection 142 activated from the block 100 either after the execution of a programme or a predetermined plurality of executions of a complete programme. In such case it would be of advantage that a light signalling or other kind of alarm be provided for calling the attention of the operator and summoning him to act for a further operation of the computer. A similar actuation of 33 and alarm may be provided in case a programme being executed reveals faulty, for instance the result of a number of operations being checked appears to exceed the digital capacity of a word in the computer. An outpassing check arrangement is quite conventional in a computer so that a mere reset and alarm connection to 33 will suffice in the computer for achieving such a result, when required.

Such modifications and additions are herein indicated to ascertain a certain special advantage of the provision of an equipment according to the invention with respect to a digital computer of the concerned kind.

For avoiding a false actuation of the equipment by the operator, it may be of advantage that, once the bistable member 21 is set to work condition, the bistable member 24 is reset to zero. This is ensured by the connection 48 activated by the setting to work condition of 21 and automatically resetting to rest condition the member 24. Consequently, the operator will only be able to initiate a further transfer when such a condition is established and when, further, the bistable member has been reset to zero as a connection 98 from said member 33 to the gates 90 to 93 only unclocks said gates when 33 is at rest condition.

The arrangement of the registers 80 to 82, 60 to 63, 30–31 and 95, together with the control equipment thereof may advantageously be made according to the embodiment of FIG. 2, wherein diode matrices are used for putting that part of the invention into practice. Each of the registers 60 to 63 and 80 to 83 is made by a column of such a matrix, from their second to last lines. The codes which are shown as defined by the diodes are quite arbitrary. Each horizontal line of each matrix, is connected to a one-digit store (a bistable member) through a gate. Said one-digit stores define together the one-word register 30–31 for the upper matrix on the drawing, and the one-word register 95 for the lower matrix. The sets of gates 170 for one matrix and 190 for the other one actually plays the part of gates 70, . . . and 90, . . . of FIG. 1 but they are introduced between the outputs of registers 60, . . . and 80, . . . and the registers 30–31 and 95 respectively so that the operation is slightly modified as follows with respect to the diagram of FIG. 1: the selection is made from push-buttons or keys 50 to 53 for the upper matrix and 40 to 43 for the lower matrix, and it is the access of the lines, carrying the voltages representatives of the digits of the code which is selected by the actuation of a key in each matrix, which determines the condition of the registers 30–31 and 95 respectively, by being or not authorized to the one-digit stores of said registers. The first horizontal line in each matrix is fully provided with diodes so that the actuation of any key from 40 to 43 sets to work condition the bistable member 24 and the actuation of any one of the keys 50 to 53 sets to work condition the bistable member 21 through the gate 22 unblocked when 24 is at work.

The outputs of the one-word stores 95 are merely connected to as many gates the outputs of which are routed to inputs of the adder 36. The outputs of the second and third horizontal lines of the first matrix connect to two bistable members constituting together the part 31 of he register 30–31, thus defining the code of the concerned quarter of track on drum 101. The outputs of said bistable members (31) are connected to corresponding inputs of the code comparator 19 of FIG. 1.

The outputs of the six other bistable members of the first matrix constituting the part 30 of the register are combined for constituting four AND-CIRCUITS, made for instance of diode arrangements as well known per se, so that in correspondence to four codes sets at 60, 61, 62, 63, four outputs are provided towards the gates 7, 8, 9 and 12 of FIG. 1 respectively. Each of said outputs is activated when selected by the corresponding push-button of the column the diode arrangement of which corresponds to that of the concerned AND-CIRCUIT. In other words, a decoder network has been provided at the outputs of the members (30) for defining the overall condition of said members and consequently selecting a track on the drum.

All other component parts of FIG. 1 are quite conventional in the digital electrical computer field and do not necessitate any further description for putting the invention into actual practice.

What is claimed is:

1. Equipment for the selective introduction of an instruction-word programme into a restricted capacity internal store of an electric digital computer from a large capacity external store wherein a plurality of complete programmes are stored, comprising the combination of a plurality of external one-word registers preset at different first instruction addresses of programmes in the said external store, an internal one-word register for receiving the content of one of the said external registers, manually operated means for controlling the selective transfer of the content of any one of said external one-word registers into said internal register and automatic means controlled by said internal one-word register for controlling according to its content a block transfer of a predetermined number of instruction-words from the large capacity external store to the internal stores of the computer.

2. Equipment according to claim 1, wherein said automatic means comprise a plurality of read-out channels from the said external store and a pulse generator producing a pulse on each instruction-word read-out for all said channels, means controlled from the content of said internal register for selectively unblocking one of said read-out channels, a counter of the pulses of said generator which are passed upon the unblocking of such a read-out channel and an instruction-word distributor controlled from said counter for routing the successively read-out instruction-words to as many successive one-word instruction registers forming part of said internal instruction store of the computer, and said counter operating to reset the equipment to zero at its maximum count.

3. Equipment according to claim 2, for a computer wherein a programme is executed by sequential transfer of instruction words from the said internal instruction store into a one-word instruction store wherefrom is controlled the execution of said instructions and wherein said sequential transfer is controlled from a sequence control switch the content of which is at each execution of instruction increase by one unit, wherein the combination further comprises a bistable member controlled from said counter for disabling the execution of programme instructions during such a block transfer from external to internal stores, at least for instructions of that part of internal instruction store whereto are routed the instructions of the programme being introduced therein.

4. Equipment according to claim 3, wherein the combination comprises a further plurality of one-word external registers preset to a plurality of numerical codes, one of which is zero, a further internal one-word register, means for manually controlling the introduction into said further internal register the content of a selected one of said further external registers, and means associated with said further internal register for automatically modifying according to the content thereof addresses of programme instructions introduced in the internal instruction store from the said selection programme equipment each time, in the said one-word instruction store the introduced instruction includes an address modification tag signal.

5. Equipment according to claim 4, wherein said instruction address modifying means includes means for disabling the execution of a unit increase in said sequence control switch and substituting therefor a code combination of the content of said further internal one-word register and the content proper of said sequence control switch.

6. Equipment according to claim 4, wherein the combination comprises means for disabling the operation of the manually controlled means for controlling a block transfer of instructions from the external store to the internal store of the computer, and means controlled by prior manual actuation of said means for introducing a modification address code in said further one-word register to prevent operation of said disabling means.

7. Equipment according to claim 6, wherein the said disabling means comprises a bistable member controlled from the actuation of said modification of address control means and reset by said counter from the maximum count thereof, and gates controlled from said bistable member for rendering ineffective any manual control of said first address one-word external register for selective transfer therefrom of one of their content to said one-word internal address register.

8. Equipment according to claim 7, wherein each one of the manually control means and external register means each includes a diode matrix and manually operated keys for routing voltages from said matrix to said internal registers.

References Cited by the Examiner

UNITED STATES PATENTS

| | | | |
|---|---|---|---|
| 2,959,351 | 11/1960 | Hamilton | 340—172.5 |
| 2,974,867 | 3/1961 | Steele | 340—172.5 |

OTHER REFERENCES

IBM Reference Manual, RAMAC 305, 1958 (221 pages), pp. 22 and 69 relied on.

ROBERT C. BAILEY, *Primary Examiner.*

MALCOLM A. MORRISON, IRVING SRAGOW, *Examiners.*

WM. BECKER, L. W. MASSEY, P. BERGER, *Assistant Examiners.*